US010997556B2

(12) United States Patent
Scott et al.

(10) Patent No.: US 10,997,556 B2
(45) Date of Patent: May 4, 2021

(54) SUMMARIZING TABULAR DATA ACROSS MULTIPLE PROJECTS USING USER-DEFINED ATTRIBUTES

(71) Applicant: Oracle International Corporation, Redwood Shores, CA (US)

(72) Inventors: David John Scott, Denver, CO (US); John David Bilthuis, Highlands Ranch, CO (US); David Wayne Nowakowski, Thornton, CO (US); Lynn J. Kelleher, Conifer, CO (US); Scott Gene Buss, Centennial, CO (US); Michael Donald Eide, Lafayette, CO (US); Deborah Marie Livingston, Littleton, CO (US); Maria Leonor Caballero Ruiz, Denver, CO (US); John Craig Spencer, Denver, CO (US); Beverly Lynn Nicol, Lafayette, CO (US); Andrew Yung Ern Tan, Cheshire (GB)

(73) Assignee: Oracle International Corporation, Redwood Shores, CA (US)

( * ) Notice: Subject to any disclaimer, the term of this patent is extended or adjusted under 35 U.S.C. 154(b) by 1311 days.

(21) Appl. No.: 14/246,785

(22) Filed: Apr. 7, 2014

(65) Prior Publication Data

US 2014/0304174 A1  Oct. 9, 2014

Related U.S. Application Data

(60) Provisional application No. 61/809,619, filed on Apr. 8, 2013.

(51) Int. Cl.
*G06Q 10/10* (2012.01)
*G06F 16/22* (2019.01)
(Continued)

(52) U.S. Cl.
CPC ....... *G06Q 10/103* (2013.01); *G06F 16/2264* (2019.01); *G06F 16/254* (2019.01);
(Continued)

(58) Field of Classification Search
CPC ............................ G06Q 10/103; G06Q 10/00
See application file for complete search history.

(56) References Cited

U.S. PATENT DOCUMENTS 7,117,215 B1 * 10/2006 Kanchwalla ...... G06F 17/30592
707/602
8,131,533 B2   3/2012 Legault et al.
(Continued)

FOREIGN PATENT DOCUMENTS

CN    101308490 B    6/2010
CN    102073926 A    5/2011
(Continued)

OTHER PUBLICATIONS

Michael White, et al. "Multidocument Summarization via Information Extraction" Mar. 2001, published in proceedings of the international conference on Human Language technology research, 7 pages.
(Continued)

*Primary Examiner* — Jan P Mincarelli
(74) *Attorney, Agent, or Firm* — Vista IP Law Group, LLP

(57) ABSTRACT

A method, system, and computer program product for enterprise applications. Embodiments commence by accessing a first database table having columns pertaining to one or more cost items of a first project and accessing a second database table having columns pertaining to cost items of a second project. A user interface aids definition of user-defined inter-project attributes, wherein the user-defined inter-project attributes relate a database table column of the (Continued)

first project to a database table column of the second project. The user-defined inter-project attributes are used in preparing display information pertaining to at least two projects such that in response to a single action being performed under control of a client system, the prepared display information is sent to a display unit. In some cases, the prepared display information comprises a summary of values, and in some cases, an alert icon is displayed based on a summary value exceeding a threshold.

20 Claims, 10 Drawing Sheets

(51) Int. Cl.
*G06Q 40/00* (2012.01)
*G06F 16/25* (2019.01)
*G06F 16/28* (2019.01)
*G06Q 20/38* (2012.01)

(52) U.S. Cl.
CPC ........... *G06F 16/283* (2019.01); *G06Q 10/10* (2013.01); *G06Q 40/12* (2013.12); *G06Q 20/381* (2013.01)

(56) References Cited

U.S. PATENT DOCUMENTS

| | | |
|---|---|---|
| 8,479,093 B2 | 7/2013 | Ravindran et al. |
| 2006/0178922 A1* | 8/2006 | Jagtiani ............ G06Q 10/06311 705/7.13 |
| 2007/0055590 A1* | 3/2007 | Kretzschmar .......... G06Q 10/06 705/30 |
| 2007/0055688 A1 | 3/2007 | Blattner |
| 2009/0204517 A1* | 8/2009 | Edens .................... G06Q 10/06 705/30 |
| 2012/0084224 A1 | 4/2012 | Bhandar et al. |
| 2012/0173476 A1* | 7/2012 | Rizvi .................. G06F 16/2465 707/601 |
| 2013/0110686 A1 | 5/2013 | Berrington et al. |
| 2014/0171017 A1* | 6/2014 | Menezes ................ G06Q 30/04 455/406 |

FOREIGN PATENT DOCUMENTS

| | | |
|---|---|---|
| EP | 1349083 A1 | 10/2003 |
| EP | 2590119 A1 | 5/2013 |
| WO | WO 2013074876 A1 | 5/2013 |
| WO | WO 2013109458 A1 | 7/2013 |
| WO | WO 2013133891 A1 | 9/2013 |

OTHER PUBLICATIONS

Korelsky, T. et al. "Knowledge Requirements for the Automatic Generation of Project Management Reports" Sep. 1993, Proceedings of the 8$^{th}$ International Conference on Knowledge-Based Software Engineering, pp. 2-9.

Check Point Software Technologies Ltd. "Using SmartReporter", 2013, from https://sc1.checkpoint.com/documents/R76/CP_R76_SmartReporter_AdminGuide/5867.htm.

* cited by examiner

SUMMARIZING TABULAR DATA ACROSS MULTIPLE PROJECTS USING USER-DEFINED ATTRIBUTES

RELATED APPLICATIONS

The present application claims the benefit of priority to U.S. Provisional Patent Application Ser. No. 61/809,619, entitled "METHOD AND SYSTEM FOR IMPLEMENTING AUTOMATED PROJECT FINANCIAL ROLLUP FOR LARGE DATA SETS", filed Apr. 8, 2013, which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of enterprise systems and applications and more particularly to techniques for summarizing tabular data across multiple projects using user-defined attributes.

BACKGROUND

Managing even a single complex project is a challenge for any project manager. The task of managing a portfolio of projects for project executives is even more challenging—it is essential for project managers to be able to understand and assess the state of their projects at any point in time. Project portfolio managers want an easy way to relate a set of characteristics or attributes of one project in the portfolio to a set of characteristics or attributes of another project in the portfolio. Unfortunately legacy techniques rely on manual data manipulations and/or manual post processing to relate a set of characteristics or attributes of one project to a set of characteristics or attributes of another project. The extent of manual manipulation needed for the project manager to understand and assess the state of a portfolio of projects is too arduous for the project manager to use. In some legacy situations, the tasks related to manual data manipulations and/or manual post processing to present project conditions summaries is so arduous that many characteristics of individual projects and many more attributes of relationships between projects never get analyzed by the project portfolio manager.

What is needed is a technique or techniques that allow a project manager to easily and flexibly create and view summaries of a project portfolio. What is needed is a way to identify characteristics between multiple projects, and to relate them to each other using user-defined attributes to define the characteristics of the summarizations. Further, what is needed is a way to repeatedly view summaries of a project portfolio using only a single click or other user-interface action.

None of the aforementioned legacy approaches achieve the capabilities of the herein-disclosed techniques for summarizing data across multiple projects using user-defined attributes. Therefore, there is a need for improvements.

SUMMARY

The present disclosure provides an improved method, system, and computer program product suited to address the aforementioned issues with legacy approaches. More specifically, the present disclosure provides a detailed description of techniques used in methods, systems, and computer program products for summarizing tabular data across multiple projects using user-defined attributes.

Some embodiments commence by accessing a first database table having columns pertaining to one or more cost items of a first project and accessing a second database table having columns pertaining to cost items of a second project. A user interacts with a user interface to define user-defined inter-project attributes, where the user-defined inter-project attributes relate a database table column of the first project to a database table column of the second project. The user-defined inter-project attributes are used in preparing display information pertaining to at least two projects such that in response to a single action being performed under control of a client system, the prepared display information is sent to a display unit. In some cases, the prepared display information comprises a summary of values, and in some cases, an alert icon is displayed based on a summary value exceeding a threshold.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

DETAILED DESCRIPTION

Figure 1A:
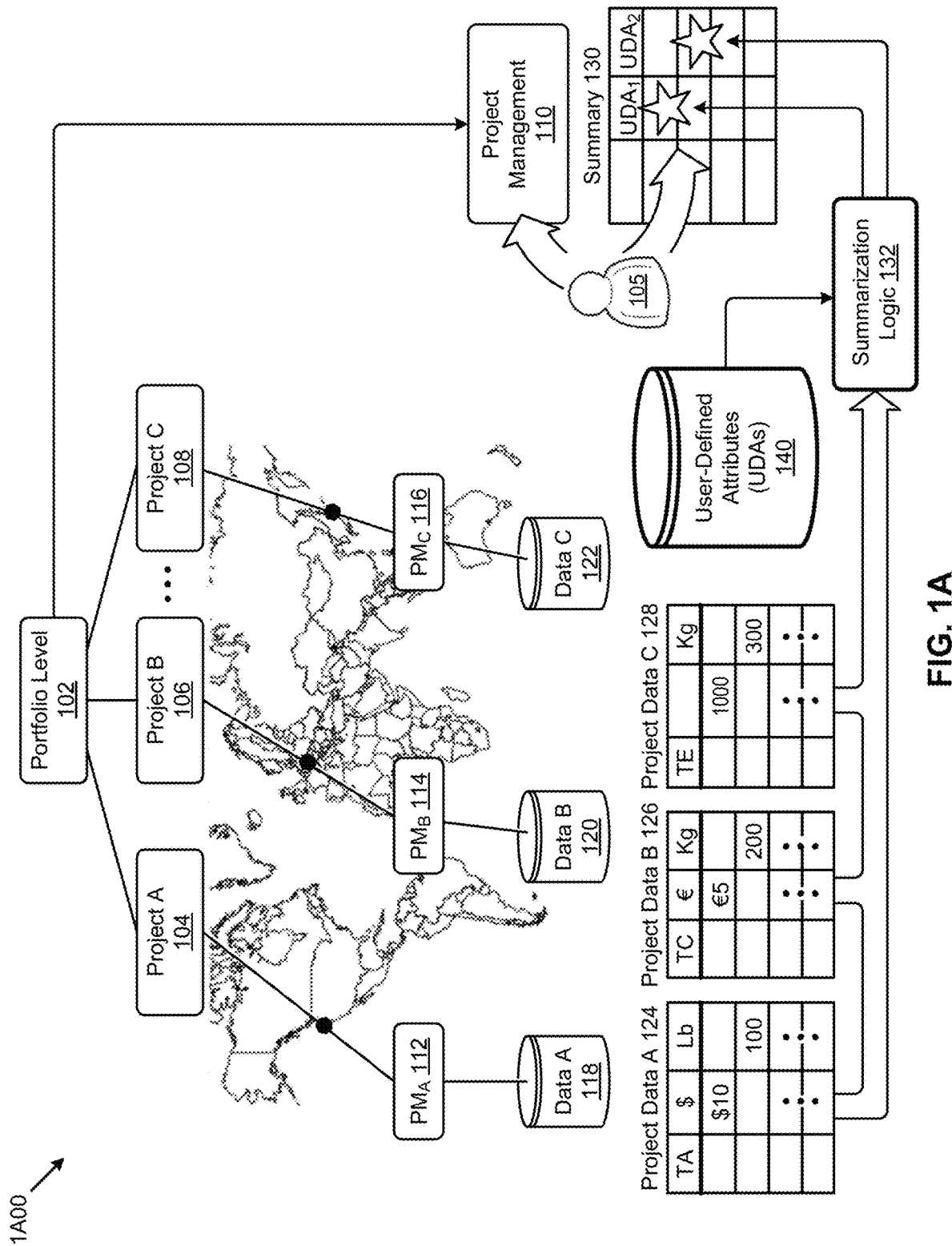
FIG. 1A depicts activities within a global environment that uses systems for summarizing tabular data across multiple projects using user-defined attributes, according to some embodiments.

Some embodiments of the present disclosure address the problem of summarizing data across multiple projects using user-defined attributes and some embodiments are directed to single action (e.g., one click) approaches for summarizing tabularized data across multiple projects using such user-defined attributes.

Overview

Managing even a single complex project is a challenge for any project manager. The task of managing a portfolio of projects for project executives is even more challenging—it is essential for them to be able to understand and assess the state of their business at any point in time. This need goes beyond project tracking to schedules and beyond merely tracking project spending to budgets. At the very least, project managers and executives need to have easy access to project budgets (e.g., in order to track actuals to forecasts), and project managers and executives need to have easy access to portfolio-wide summary data to determine the extent and details of open commitments, invoice status, cash received, etc. Moreover project managers and executives need to have easy-to-use techniques to relate a set of user-defined characteristics or attributes of one project to a set of characteristics or attributes of another project; and such characteristics or attributes might need to be defined at any moment in time throughout the progression of the projects. Furthermore a project or a portfolio of projects might have many different stakeholders involved. And one project manager might want to view a project or series of projects with one particular view, and another project manager might want to view a project or series of projects with a different view. For example, at one moment in time, a project manager might want to view a project's financial information pertinent to one set of stakeholders (e.g., the Japan executive team), and at another moment in time, the project manager might want to focus on different financial information pertinent to another set of stakeholders (e.g., the German executive team).

Such different views for different stakeholders might arise for reasons other than the aforementioned differences in geographies. For example, different customers might want bills or invoices for project-related activities in one summary form or another summary form. Also, managers may want to analyze multiple projects in different ways based on the type of project (e.g., office building construction, road building, nuclear power plant construction, etc.).

The foregoing scenarios (e.g., projects involving multiple geographies, multiple currencies, multiple units of measurement, etc.) present challenges to project managers and project executives to be able to quickly (e.g., in a single click or action) pull together the needed project-related information (e.g., financial information) to present in a single interactive summary view.

Definitions

Some of the terms used in this description are defined below for easy reference. The presented terms and their respective definitions are not rigidly restricted to these definitions—a term may be further defined by the term's use within this disclosure.

The term project refers to any collection of characteristics of an endeavor. Such characteristics can include tasks, schedules, resources, costs, etc. Costs or cost-related items are examples of characteristics of a project, and such cost items can comprise any of project direct costs, procurement contract costs, labor costs, labor rates, budget amounts, accounts payable amounts, and/or accounts receivable amounts, etc. Cost items can further comprise any combinations or formulas involving any of the foregoing cost items. Projects can comprise any combinations or collections of characteristics of an endeavor.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.

The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

DESCRIPTIONS OF EXEMPLARY EMBODIMENTS

FIG. 1A depicts activities within a global environment 1A00 that uses systems for summarizing tabular data across multiple projects using user-defined attributes. As an option, one or more instances of global environment 1A00 or any aspect thereof may be implemented in the context of the architecture and functionality of the embodiments described herein. Also, the global environment 1A00 or any aspect thereof may be implemented in any desired environment.

A user 105 might be a member of a project management team serving a project management function 110, and the project management function might be charged with overseeing several projects in several geographies. A group of projects might be drawn into a portfolio, and the user might want to see a summary view and/or analyze data at a summary level (e.g., summarized as pertaining to the several projects). As shown, a project is organized into a hierarchy having a portfolio level 102, which in turn has several project activities (e.g., project data A 104, project data B 106, project data C 108, etc.). In this illustration, the various project activities are geographically distant. As shown, project A 104 is centered in the United States of America, project B 106 is centered in the European Union, and project C 108 is centered in Japan. Each project in each geography manages its own set of aspects of the overall project, and a project manager (e.g., $PM_A$ 112, $PM_B$ 114, $PM_C$ 116) assigned to each project manages their own activities. A local project manager interacts with local project resources (e.g., employees, suppliers, customers, etc.), and data items pertaining to the project are stored (e.g., in data A 118, data B 120, data C 122, etc.). In some cases a local project manager might interact with a localized enterprise application in order to record and otherwise manage the progression of the project. Enterprise applications might include an enterprise resource planning (ERP) application and/or a budgeting application and/or an accounts payable application and/or an accounts receivable application, etc. Data items pertaining to the project (e.g., in data A 118, data B 120, data C 122, etc.) can be stored in tabular forms (e.g., ledgers), and such tabular forms might comprise of any number of accounts (e.g., account within project A 124, account within project B 126, account within project C 128, etc.). Some project data can be represented in data structures such as tables and/or arrays and/or accounts and/or relations (e.g., in a relational database).

A local project manager might want to monitor the progression of the project using the stored data items. For example, a local project manager (e.g., a local project manager situated in Seattle, Wash.) might want to know how many project dollars have been spent on "consulting services" and/or might want to know how many pounds of "powdered magnesium" have been consumed on-site since the beginning of the year. Similarly, a local project manager (e.g., a local project manager situated in Toulouse, France) might want to know how many euros have been spent on "consulting services" and/or might want to know how many kilograms of "powdered magnesium" have been consumed on-site since the beginning of the year. Similarly, a local project manager (e.g., a local project manager situated in Tokyo, Japan) might want to know how many yen have been spent on "consulting services" and/or might want to know how many kilograms of "powdered magnesium" have been consumed since the beginning of the year. As can now be noted, each project might manage and store data items in units that are convenient for that locale (e.g., dollars, euros, yen, pounds, kilograms, etc.).

Also shown in FIG. 1A is an instance of summarization logic 132 that takes as inputs data item values from several tables or other representations (e.g., project data A 124, project data B 126, project data C 128, etc.), as well as inputs in the form of user configurations (e.g., user-defined attributes 140), and produces summaries in tabular form. Any number of inputs or user-defined attributes can be defined and rolled up into a summary 130. As shown, the summarization logic processes data item values across the portfolio of projects and summarizes the normalized data in a summary display having columns corresponding to user-defined attributes (e.g., $UDA_1$, $UDA_2$, etc.).

Any of the aforementioned operations and/or summarizations and/or displays can be implemented in an application server. An illustrative operating environment includes multiple application servers, a database engine, and middleware to host interfaces (e.g., web servers) situated between a user and applications.

Figure 1B:
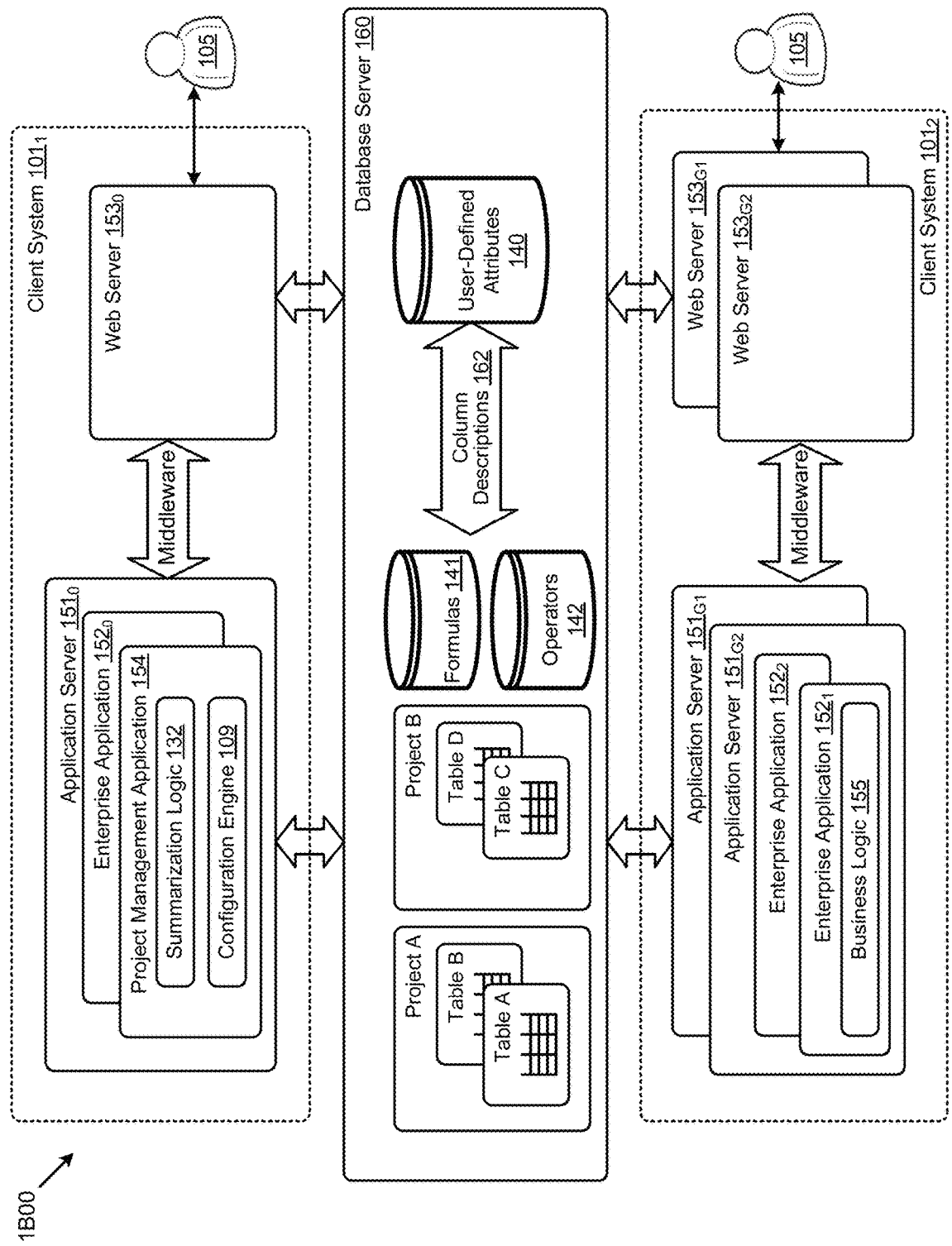
FIG. 1B depicts an operating environment including application servers implementing business logic functions and project management application functions to implement user configuration of a system for summarizing tabular data across multiple projects using user-defined attributes, according to some embodiments.

FIG. 1B depicts an operating environment 1B00 including application servers implementing business logic functions (e.g., see business logic 155) and project management application functions to implement user configuration of a system for summarizing tabular data across multiple projects using user-defined attributes. As an option, one or more instances of operating environment 1B00 or any aspect thereof may be implemented in the context of the architecture and functionality of the embodiments described herein.

As shown, environment 1B00 comprises an application server 151$_0$ that hosts any number of applications (e.g., enterprise application 152$_0$, project management application 154, etc.). The application server 151$_0$ stores data using a database engine (e.g., in a database server 160) which in turn stores project data that is represented in data structures such as arrays and/or as tables (e.g., table A and table B). Relationships between columns of tables within a project or between projects tables (e.g., project A and project B) can be defined (e.g., by a user) and can be stored as user-defined attributes. Such relationships between columns can include formulas 141 that use column data as operands of the formulas, and any user-defined or any known forms of operators 142 can facilitate calculating a user-defined attribute. For example, a manager of a portfolio of projects (e.g., a user) might want to know the total value of the portfolio-wide expenditures on "powdered magnesium". Accordingly, a user-defined attribute called (for example) "dollars spent on powdered magnesium" might be defined as follows:

take in the amount of powered magnesium (in pound weight) from table A of Project A;
take in the amount of powered magnesium (in kilograms of mass) from table C of Project B;
convert the kilogram units from table C into pounds;
add the weights together; and then,
convert the summed weights into the dollar amount spent across the portfolio on powdered magnesium.

Other examples abound, and many formulas 141 such as the foregoing example use a combination of columns and other data as operands. The foregoing example uses multiple operators, namely the addition operator (e.g., to calculate a sum) as well as a multiplier operator (e.g., to calculate the dollar value from a weight). Other operands can be built-in or can be user-defined.

Continuing the description of environment 1B00, other application servers can access the database server 160. For example application server 151$_{G1}$ might be installed in Seattle, and application server 151$_{G2}$ might be installed in Tokyo, and both can access the database server 160. Moreover an application server can host any number of enterprise applications (e.g., enterprise application 152$_0$, enterprise application 152$_1$, enterprise application 152$_2$, project management application 154, etc.).

To facilitate user interaction, middleware components may be provided in any geography (e.g., web server 153$_0$, web server 153$_{G1}$, web server 153$_{G2}$, etc.). In particular, a project management application 154 can be deployed in any geography and/or run on any application server and interface with any middleware component. Similarly, project accounts and any constituent data items stored in database server 160 can be shared (e.g., for READ, WRITE and/or other accesses) by any application.

Any user in any geography can use an application and/or an interface to access column descriptions 162, and to configure formulas 141, operators 142, and to configure and store user-defined attributes 140, which can in turn be applied across multiple projects.

Column descriptions can be pre-configured or user-configured (e.g., see configuration logic 109) to indicate the type of information the user wants to see, and have that type of information summarized according to a pre-configured or user-defined name. Users can select column descriptions based on the name(s) of table column(s), and/or column description(s) can be user-defined (e.g., via a text field). For example, a column description might be selected or defined as "Actual Costs", or as "Revised Budgets", or as "Billed Amounts", or as "Cash Received", etc. When a user chooses to summarize on a specific user-defined attribute (e.g., "Actual Costs") across a portfolio, the amounts in the corresponding column or columns are summarized and displayed together with the user-defined attribute.

Exemplary techniques for configuring and using user-defined attributes across multiple projects is presently discussed.

Figure 1C:
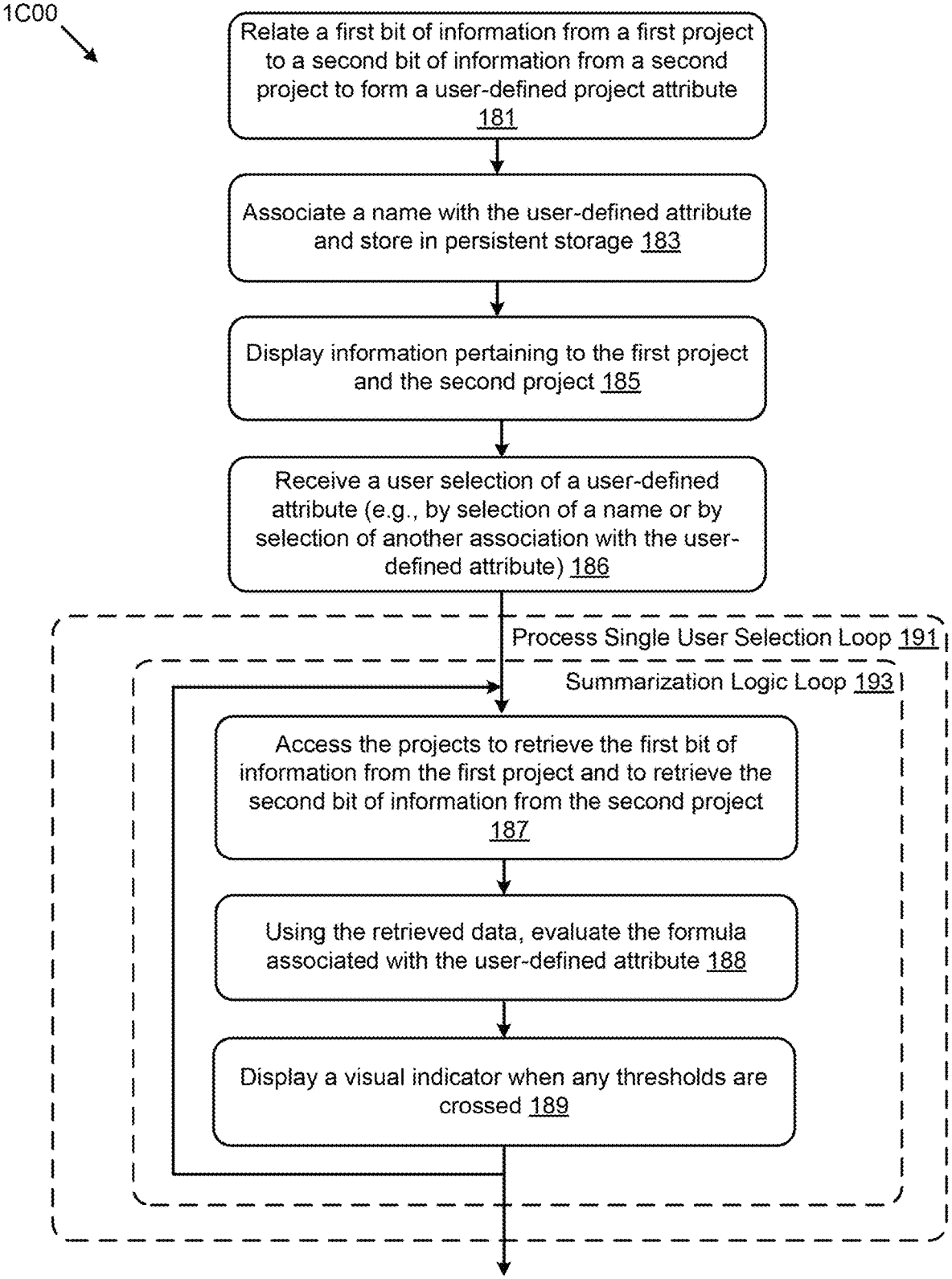
FIG. 1C depicts a flow for summarizing tabular data across multiple projects using user-defined attributes, according to some embodiments.

FIG. 1C depicts a flow 1C00 for summarizing tabular data across multiple projects using user-defined attributes. As an option, one or more instances of flow 1C00 or any aspect thereof may be implemented in the context of the architecture and functionality of the embodiments described herein. Also, the flow 1C00 or any aspect thereof may be implemented in any desired environment.

Project portfolio managers need a way to repeatedly view summaries of a project portfolio using only a single click or other single user interface action. It often occurs that a portfolio of projects has a long lifespan (e.g., many months, or many years, etc.). During the progression of the constituent projects, the project portfolio manager might need to check on any number of user-defined attributes on a regular basis, sometimes even daily or hourly.

The shown flow serves to implement a single-click method of summarizing inter-project attributes. The flow commences by defining one or more user-defined inter-project attributes. An inter-project attribute can be defined in any manner so as to relate a first bit of information from a first project to a second bit of information from a second project (see step 181). In some cases the user-defined inter-project attribute serves to relate a database table column of a first project to a database column of a second project (see step 181). The relationship of the first bit of information to the second bit of information can include a formula (e.g., see formulas 141), and functions (e.g., operators 142) performed over the operands of the formulas. The relationship or relationships can be stored in a persistent storage facility (e.g., the user-defined attributes 140 in database server 160). Any relationship can be assigned a name. The assigned name can be used as an attribute moniker to refer to the relationship (e.g., "dollars spent on powdered magnesium"), and the association between the name and the relationship can be stored (see step 183).

Under control of a client system (e.g., client system $101_1$, client system $101_2$, etc.), information is displayed (e.g., from a user interface), which information pertains to the two projects (see step 185). In exemplary cases, the display of information pertaining to the two projects includes one or more of the inter-project attributes. Next, the flow receives a user selection (see step 186) and processing loops are entered (see process single user selection loop 191 and summarization logic loop 193). Steps within the loops operate in response to only a single user action being performed. Exemplary responses include:
 sending a request to access database tables of the projects (see step 187), and to process the inter-project attribute over all rows in a column (e.g., a column used in at least one of the two projects);
 processing of one or more inter-project attributes over all rows in a column might comprise evaluating a formula that uses the column data as formula operands (see step 188);
 displaying an alert icon based on the inter-project attribute and one or more thresholds (see step 189);
 converting and/or aggregating and/or normalizing a unit of measurement value (e.g., a currency value, a weight value, etc.);
 calculating and/or aggregating and/or normalizing rates (e.g., labor cost based on a first labor rate and a second labor rate).

Some of the foregoing steps, in particular certain definition steps, can be facilitated by systems that support an interactive interface. Some example embodiments of such an interactive interface are now briefly discussed.

Figure 1D:
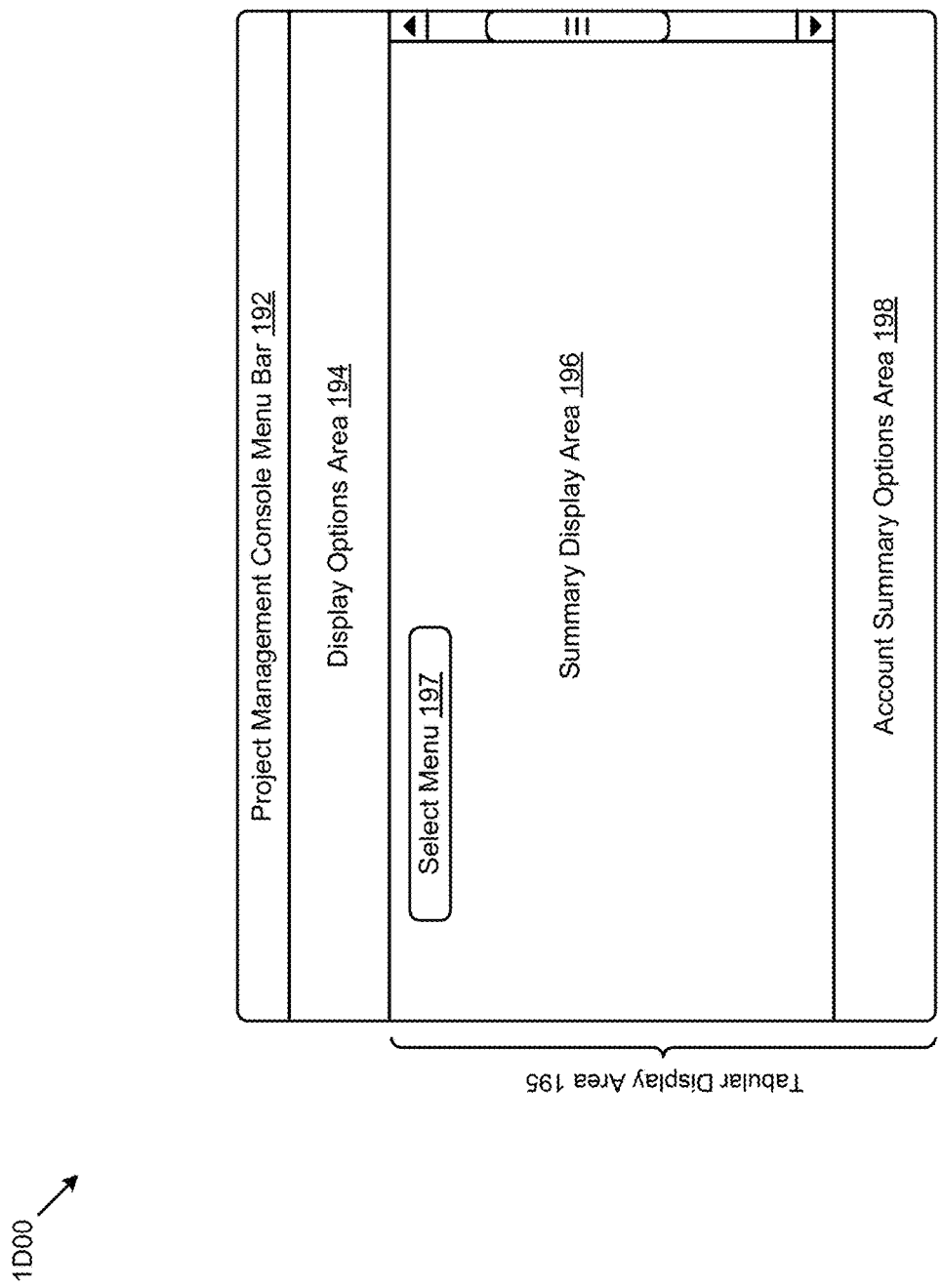
FIG. 1D depicts an interactive interface as used in systems for summarizing tabular data across multiple projects using user-defined attributes, according to some embodiments.

FIG. 1D depicts an interactive interface 1D00 as used in systems for summarizing tabular data across multiple projects using user-defined attributes. As an option, one or more instances of interactive interface 1D00 or any aspect thereof may be implemented in the context of the architecture and functionality of the embodiments described herein. Also, the interactive interface 1D00 or any aspect thereof may be implemented in any desired environment.

As shown, the interactive interface 1D00 includes areas for display and areas for user entry. In particular, the interactive interface 1D00 includes a tabular display area 195, and a project management console menu bar 192 from which a user can control aspects of the display and initiate configuration actions. Any number of configuration options can be displayed or entered into the display options area 194. Strictly as one example, the display options area may accept inputs from a user as pertaining to the time period covered by the displayed tables or accounts that are presented in the summary display area 196. Various display characteristics of the data presented in the summary display area can be controlled using screen devices found in the account summary options area 198. As shown, the summary display area 196 includes a select menu 197. The select menu 197 is merely one possibility of a screen device to be used by user view summaries of a project portfolio using only a single user-interface action. The select menu can be populated with any number of monikers associated with a user-defined attribute, and merely selecting one of the select menu options serves to initiate processing responsive to the single user selection loop 191. For example, clicking a mouse key or releasing the mouse key serves to select one of the select menu options, which in turn invokes summarization logic 132. Processing through the summarization logic 132 reaches the summarization logic loop 193 to loop through evaluation of the formulas corresponding to the selected menu option.

The interactive interface 1D00 can be adorned in any manner. Several adorned embodiments are presented hereunder.

Figure 2:
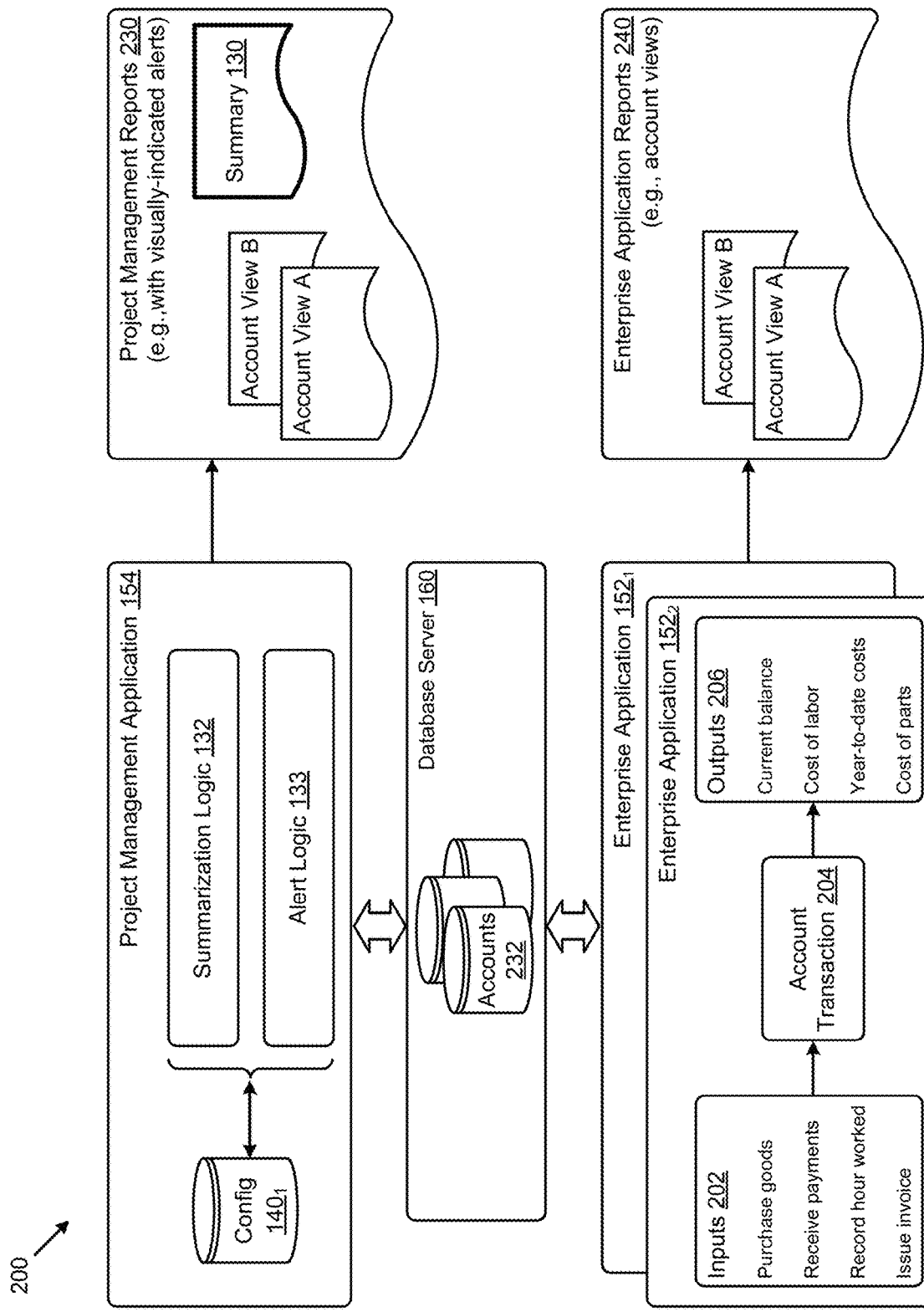
FIG. 2 depicts a technique for generating instances of account-centric project management reports as used in systems for summarizing tabular data across multiple projects using user-defined attributes, according to some embodiments.

FIG. 2 depicts a technique 200 for generating instances of account-centric project management reports as used in systems for summarizing tabular data across multiple projects using user-defined attributes.

As aforementioned, some project data can be represented in data structures such as tables and/or arrays and/or accounts. The embodiment of FIG. 2 includes accounts 232 from which accounts constituent data can be comprised of input data (e.g., inputs 202), output data (e.g., outputs 206), and transactions (e.g., account transaction 204). In some cases an enterprise application (e.g., enterprise application $152_2$) can emit reports (e.g., enterprise application reports 240). Another application (e.g., project management application 154) can read accounts and present account data, possibly using the summarization logic 132. The data presentation conforms to the configuration data (e.g., config $140_1$) as shown. More particularly, if the configuration data includes alerts and thresholds, alert logic 133 can adorn configuration data with alert colors and/or icons and/or other alert indications. Any amalgamations of, or portions of, project management reports 230 can include a summary 130, which in turn can include alerts based on user-defined attributes and/or user-defined alerts and/or user-defined thresholds.

The aforementioned user-defined attributes, user-defined alerts, and user-defined thresholds can be configured by a user using a screen display or other interactive display device. One example of an interactive configuration display device is given in the following FIG. 3.

Figure 3:
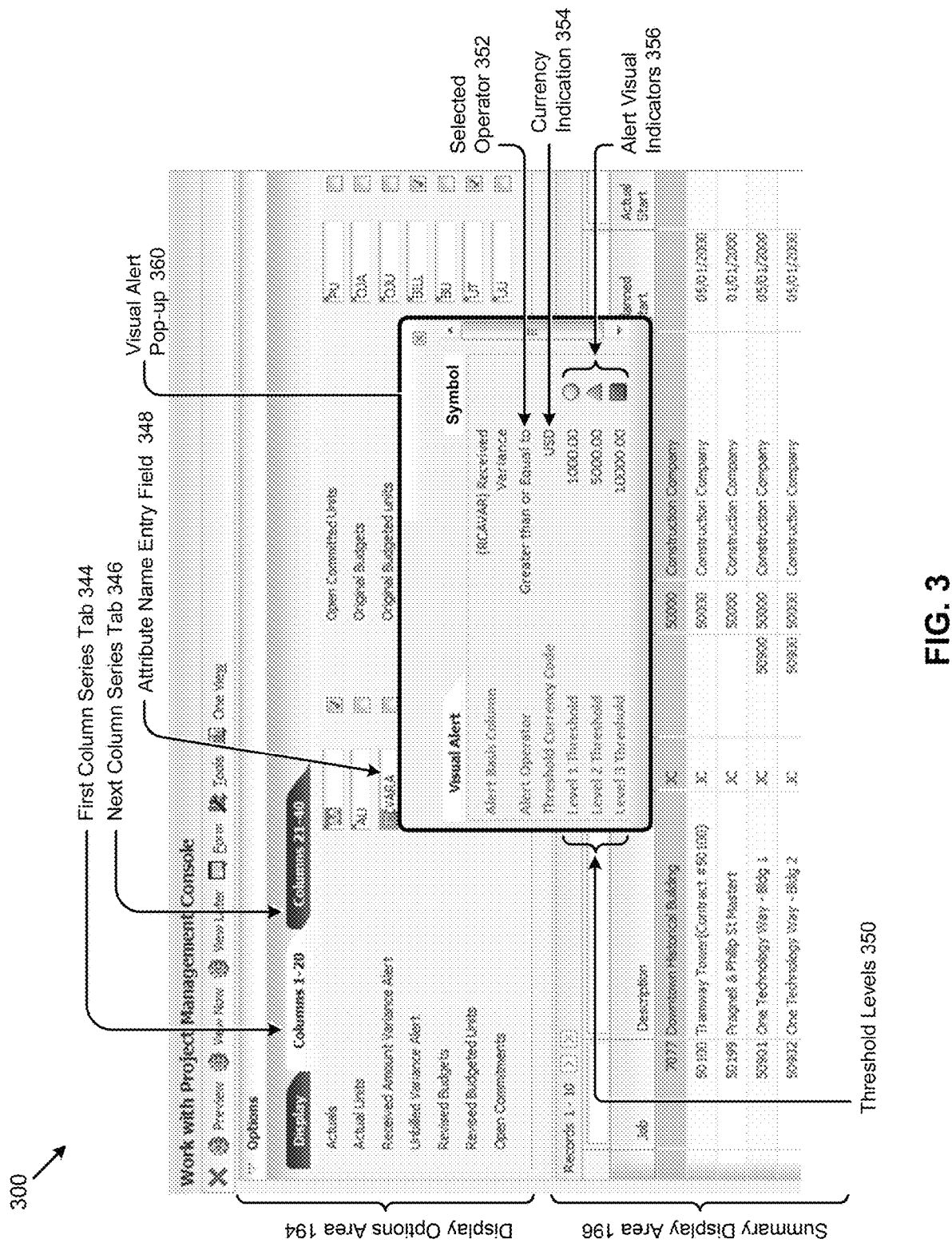
FIG. 3 depicts an interactive configuration view as used in systems for summarizing tabular data across multiple projects using user-defined attributes, according to some embodiments.

FIG. 3 depicts an interactive configuration view 300 as used in systems for summarizing tabular data across multiple projects using user-defined attributes. As an option, one or more instances of interactive configuration view 300 or any aspect thereof may be implemented in the context of the architecture and functionality of the embodiments described herein. Also, the interactive configuration view 300 or any aspect thereof may be implemented in any desired environment.

As shown in FIG. 3, certain configuration items are displayed in the display options area 194, and certain project management data is displayed in the summary display area 196. As depicted, project management data is displayed in a row and column format, and the display options area 194 includes a presentation of screen devices that facilitate configuration of user-defined attributes based on columns of the shown project management data. For example, a first column series tab 344 serves to present a set of columns drawn from the displayed project management data. Further, a next column series tab 346 serves to present a second set of columns drawn from the displayed project management data. The screen devices in the display options area 194 pertain to columns taken from the project management data. Any column can be selected and reported on in accordance with one or more user-defined attributes, and such a user-defined attribute can be associated with a column description and a visual alert. Further, any visual alert can be individually configured. Techniques for defining and configuring alerts are further described in U.S. patent application Ser. No. 14/188,341, entitled "PROJECT MANAGEMENT ALERTS USING HETEROGENEOUS PROJECT DATA," filed on Feb. 24, 2014, which is hereby incorporated by reference in its entirety.

In the embodiment shown, the visual alert pop-up 360 facilitates configuration of a user-defined attribute, including threshold levels 350, a selected operator 352, a currency indication 354, and alert visual indicators 356. In the example shown, the received variance amount (e.g., see the name "RCVARA" in the attribute name entry field 348) is associated with the operator "Greater than or Equal to". The received variance amount (a column value) is converted into a convenient currency, if necessary, and compared to a threshold value. If the threshold is crossed, an alert is visually depicted in the corresponding row. Multiple threshold levels can be present, and any threshold level can have its own value and can have its own alert visual indicator.

The display options area 194 can be collapsed. The screen space formerly occupied by the display options area can be used for display or records in the summary display area. Such a scenario is depicted in the following figure.

Figure 4:
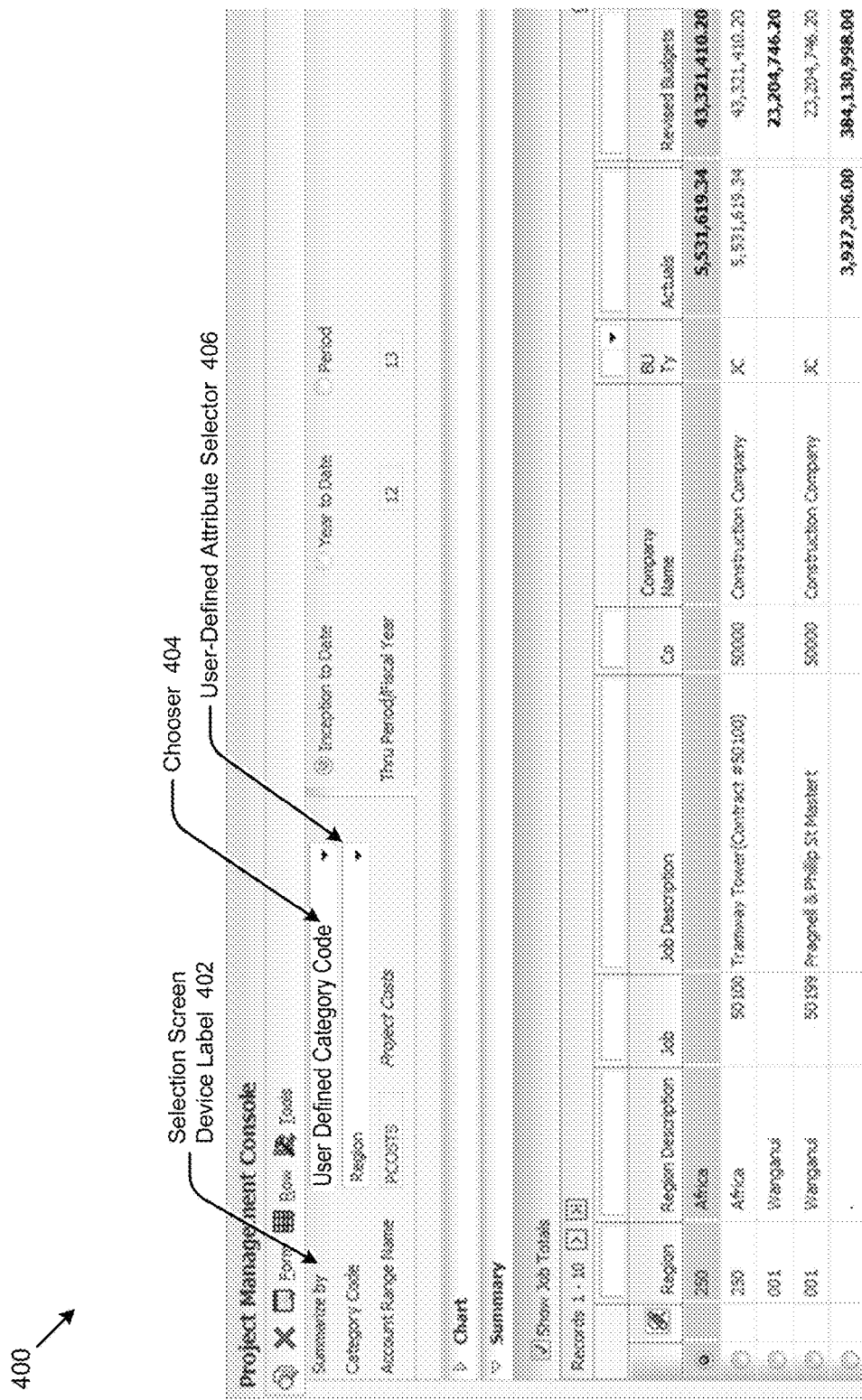
FIG. 4 depicts an interactive project data view including a user-defined category code menu as used in systems for summarizing tabular data across multiple projects using user-defined attributes, according to some embodiments.

FIG. 4 depicts an interactive project data view 400 including a user-defined category code menu as used in systems for summarizing tabular data across multiple projects using user-defined attributes. As an option, one or more instances of interactive project data view 400 or any aspect thereof may be implemented in the context of the architecture and functionality of the embodiments described herein. Also, the interactive project data view 400 or any aspect thereof may be implemented in any desired environment.

As shown in FIG. 4, project data is displayed row-by-row, and this exemplary display includes a screen device to accept an input from a user so as to specify a user-defined attribute. A project manager might want to summarize the data by any particular column, and the combination of the shown selection screen device label 402 and the chooser 404 facilitates specification of such a summary Additionally, the chooser can be set to pertain to user-defined attributes (e.g., the shown user-defined category code) and a particular user-defined attribute can be selected using the user-defined attribute selector 406. In this embodiment, after interacting with the user-defined attribute selector 406, the act of releasing the mouse button invokes summarization logic 132. Processing through the summarization logic 132 reaches a summarization logic loop which in turn loops through evaluation of the formulas corresponding to the selected user-defined attribute.

The act of evaluation of the formulas corresponding to the selected user-defined attribute serves to calculate data needed for an interactive summary display (e.g., summarizing by region). Such a summary display is shown and described in the following figure.

Figure 5:
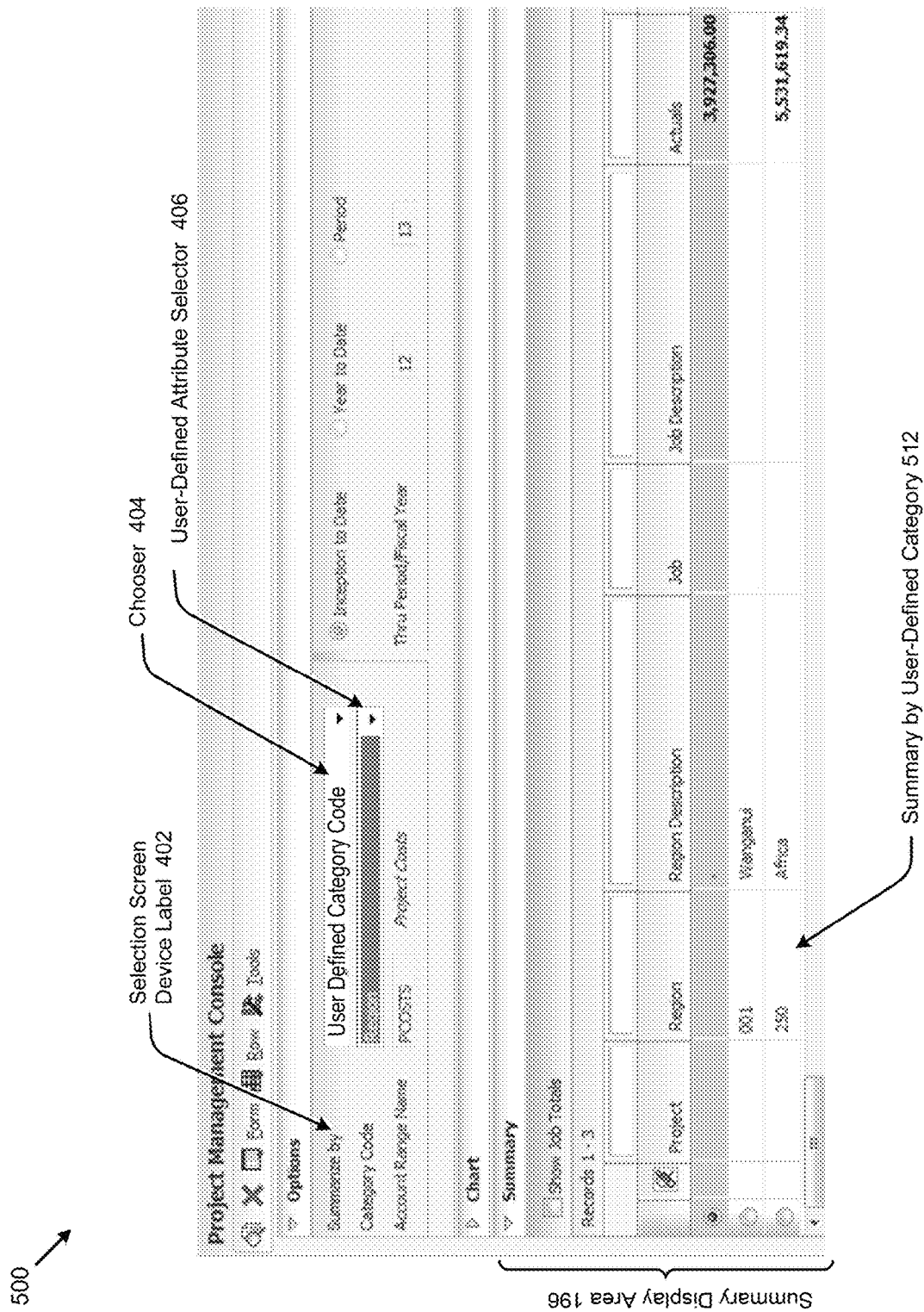
FIG. 5 depicts an interactive summary view displayed in accordance with a selected category code as used in systems for summarizing tabular data across multiple projects using user-defined attributes, according to some embodiments.

FIG. 5 depicts an interactive summary view 500 displayed in accordance with a selected category code as used in systems for summarizing tabular data across multiple projects using user-defined attributes. As an option, one or more instances of interactive summary view 500 or any aspect thereof may be implemented in the context of the architecture and functionality of the embodiments described herein. Also, the interactive summary view 500 or any aspect thereof may be implemented in any desired environment.

As shown in FIG. 5, the presence of a chooser 404 prompts the user for criteria, according to which criteria the information for presentation in the summary display is to be processed. In this case, the user selects "User Defined Category Code" via the chooser, and the user further selects a category code value "Region" using the user-defined attribute selector 406. The foregoing is merely an example, and the characteristics of the chooser and/or of the category code, and/or of any of the screen devices to facilitate user interaction can vary.

Continuing this example, the act of selecting the value "Region" for the category code attribute invokes summarization logic 132. The summarization logic in turn accesses the database(s), performs calculations, and displays summarized rows within the summary display area 196, where the summarized rows are presented in response to the act of selecting the value for the category code attribute. In this example, the column "Region" is used in a user-defined category code, which user-defined category code assigned to "Region" serves to present a summary by user-defined category 512, as shown.

Additional Embodiments of the Disclosure

Additional Practical Application Examples

Figure 6:
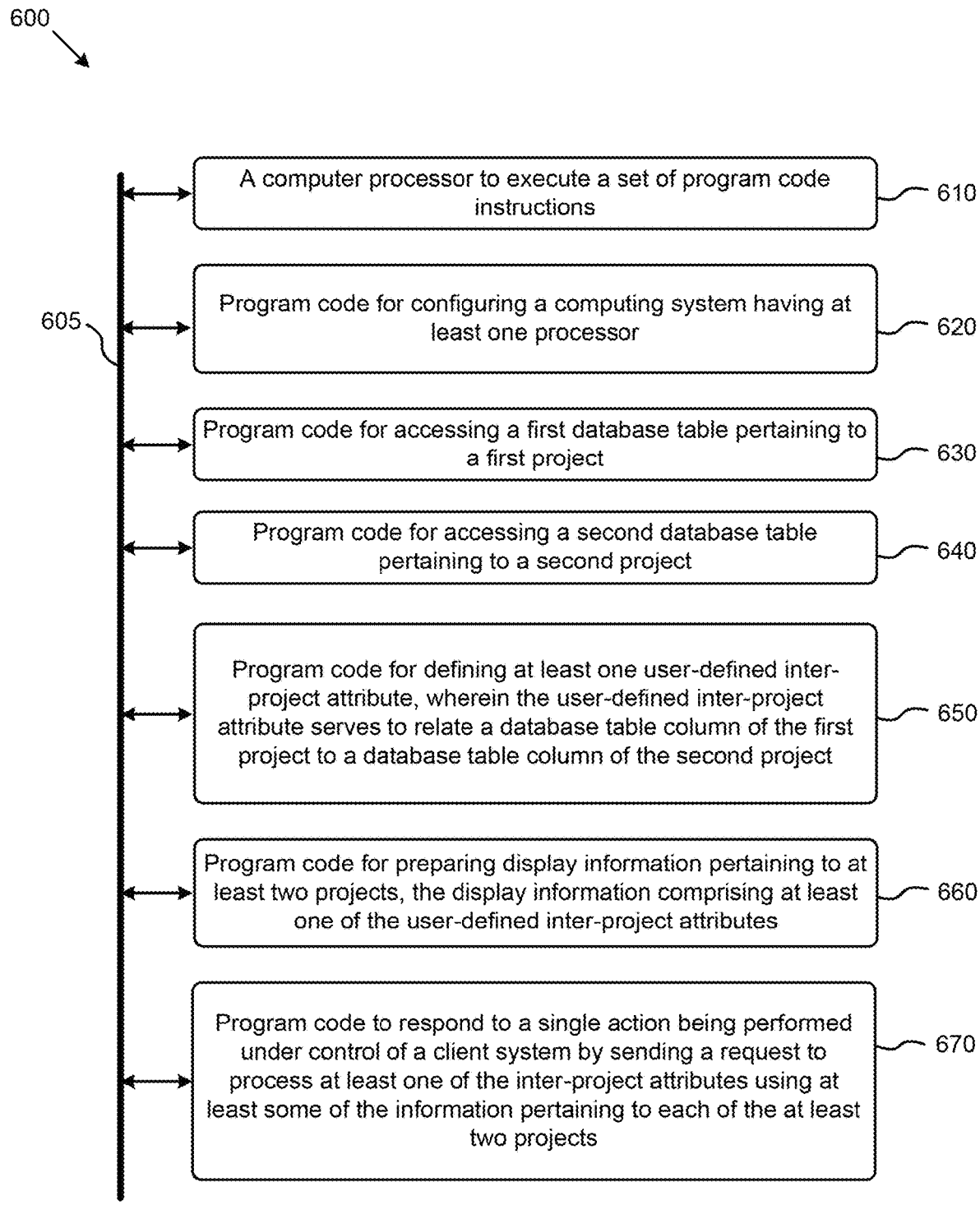
FIG. 6 is a block diagram of a system for summarizing tabular data across multiple projects using user-defined attributes, according to an embodiment.

FIG. 6 is a block diagram of a system for summarizing tabular data across multiple projects using user-defined attributes, according to a particular embodiment. As an option, the present system 600 may be implemented in the context of the architecture and functionality of the embodiments described herein. Of course, however, the system 600 or any operation therein may be carried out in any desired environment. As shown, system 600 comprises at least one processor and at least one memory, the memory serving to store program instructions corresponding to the operations of the system. An operation can be implemented in whole or in part using program instructions accessible by a module. The modules are connected to a communication path 605, and any operation can communicate with other operations over communication path 605. The modules of the system can, individually or in combination, perform method operations within system 600. Any operations performed within system 600 may be performed in any order unless as may be specified in the claims. The embodiment of FIG. 6 implements a portion of a computer system, shown as system 600, comprising a computer processor to execute a set of program code instructions (see module 610) and modules for accessing memory to hold program code instructions to perform: configuring a computing system having at least one processor (see module 620); accessing a first database table having columns pertaining to one or more cost items of a first project (see module 630); accessing a second database table having columns pertaining to one or more cost items of a second project (see module 640); defining at least one user-defined inter-project attribute, wherein the user-defined inter-project attribute serves to relate a database table column of the first project to a database table column of the second project (see module 650); preparing display information pertaining to at least two projects, the display information comprising at least one of the user-defined inter-project attributes (see module 660); and, in response to a single action being performed under control of a client system, sending a request to display at least one of the inter-project attributes using at least some of the display information pertaining to each of the at least two projects (see module 670).

System Architecture Overview

Additional System Architecture Examples

Figure 7:
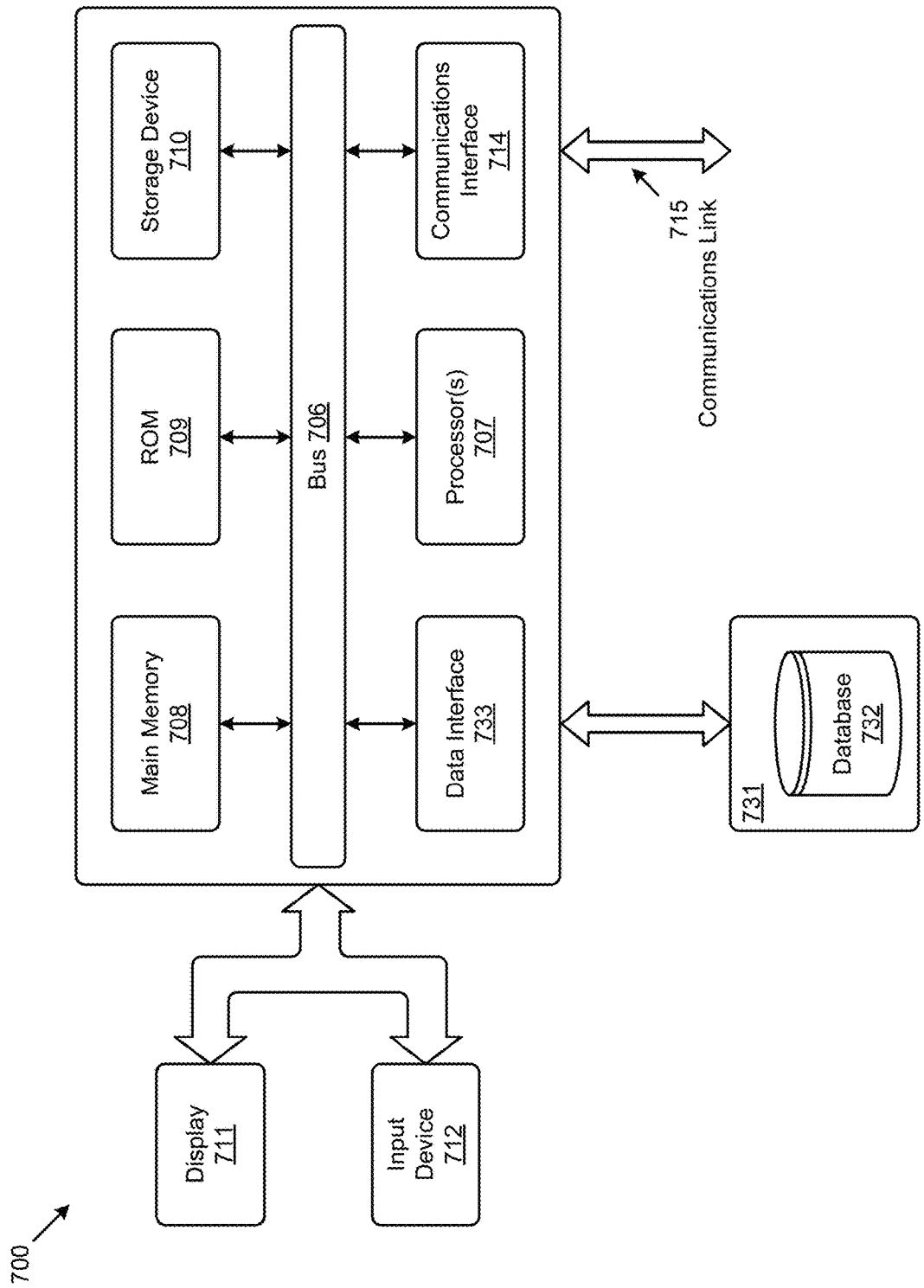
FIG. 7 depicts a block diagram of an instance of a computer system suitable for implementing an embodiment of the present disclosure.

FIG. 7 depicts a block diagram of an instance of a computer system 700 suitable for implementing an embodiment of the present disclosure. Computer system 700 includes a bus 706 or other communication mechanism for communicating information, which interconnects subsystems and devices, such as a processor 707, a system memory 708 (e.g., RAM), a static storage device (e.g., ROM 709), a disk drive 710 (e.g., magnetic or optical), a data interface 733, a communication interface 714 (e.g., modem or Ethernet card), a display 711 (e.g., CRT or LCD), input devices 712 (e.g., keyboard, cursor control), and an external data repository 731.

According to one embodiment of the disclosure, computer system 700 performs specific operations by processor 707 executing one or more sequences of one or more instructions contained in system memory 708. Such instructions may be read into system memory 708 from another computer readable/usable medium, such as a static storage device or a disk drive 710. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 707 for execution. Such a medium may take many forms, including but not limited to, non-volatile media and volatile media. Non-volatile media includes, for example, optical or magnetic disks, such as disk drive 710. Volatile media includes dynamic memory, such as system memory 708.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 700. According to certain embodiments of the disclosure, two or more computer systems 700 coupled by a communications link 715 (e.g., LAN, PTSN, or wireless network) may perform the sequence of instructions required to practice the disclosure in coordination with one another.

Computer system 700 may transmit and receive messages, data, and instructions, including programs (e.g., application code), through communications link 715 and communication interface 714. Received program code may be executed by processor 707 as it is received and/or stored in disk drive 710 or other non-volatile storage for later execution. Computer system 700 may communicate through a data interface 733 to a database 732 on an external data repository 731. A module as used herein can be implemented using any mix of any portions of the system memory 708, and any extent of hard-wired circuitry including hard-wired circuitry embodied as a processor 707.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than in a restrictive sense.

What is claimed is:

1. A computer implemented method comprising:
   accessing, at a configuration engine of a management application, a first database table of a first project managed by a first application, the first database table comprising a plurality of first database table columns and a plurality of first database table rows;
   accessing, at the configuration engine of the management application, a second database table of a second project managed by a second application, the second database table comprising a plurality of second database table rows and a plurality of second database table columns;
   determining a relationship between a first database table column of the plurality of first database columns and a second database table column of the plurality of second database columns, wherein the first database table column stores a first set of data item values as a first type of data of the first project, and the second database table column stores a second set of data item values as a second type of data of the first project, and the first type is different from the second type;
   configuring multiple thresholds that factor in conversions for the first and the second sets of data item values stored in different units of measurement;

storing the relationship as at least one user-defined attribute at the configuration engine of the management application, wherein
the at least one user-defined attribute relates the first database table column in the first database table of the first project to the second database table column in the second database table of the second project,
the at least one attribute includes summarization logic and an operation, wherein the summarization logic receives the first database table column and the second database table column as operands and performs the operation on at least one of the first database table column and the second database table column,
the first database table column selected from a column of the first database table, and
the second database table column is selected from a column of the second database table;
displaying a summary in a user interface for the first project and the second project based at least in part upon the at least one user-defined attribute at least by:
receiving a single user interface action by a user in the user interface, wherein the single user interface action selects the at least one user-defined attribute presented to the user in the user interface, and a selection of the at least one user-defined attribute in the user interface triggers an execution of the summarization logic in the at least one user-defined attribute for the first database table of the first project managed by the first application, and the second database table of the second project managed by the second application;
in response to the single user interface action, programmatically generating the summary from at least the first database table of the first project managed by the first application and the second database table of the second project managed by the second application at least by:
executing the summarization logic in response to the selection of the at least one user interface attribute to generate the summary at least by performing the operation defined by the at least one user-defined attribute on at least one of the first type of data and the second type of data, wherein
the first type of data is in at least one row of the plurality of first database table rows corresponding to the first database table column of the first database table of the first project managed by the first application, and the second type of data is in at least one row of the plurality of second database table rows corresponding to the second database table column of the second database table of the second project managed by the second application; and
storing the summary in a user-configurable database table column of summary database table;
displaying the summary in the user interface, the summary corresponding to at least some of the first type of data from first database table column of the first database table of the first project and at least some of the second type of data from the second database table column of the second database table of the second project in the user-configurable database table column of the summary database table; and displaying, in the user interface, a visual alert corresponding to one or more alerts that are displayed as emphasized rows comprising respective visual indicators in an alert column.

2. The method of claim 1, further comprising:
configuring the one or more alerts to evaluate against user-defined formulas based on values from multiple numeric factors;
creating the one or more alerts to cause evaluation against an external user-defined data structure;
associating the one or more alerts against a set of account ranges for targeting specific account types;
creating a particular alert of the one or more alerts to apply to multiple accounts or a range of accounts; and
displaying, in the summary display, the multiple accounts in an alert state.

3. The method of claim 1, further comprising defining an alert icon based at least in part on at least one of the user-defined attributes, wherein the alert icon is defined based at least in part on a threshold value corresponding to the at least one user-defined attribute.

4. The method of claim 1, further comprising:
determining the relationship for the first database table column in the first database table and the second database table column in the second database table, wherein the relationship comprises a formula that is used to operate on data in the first database column or the second database column;
assigning an identification to the relationship;
storing the relationship as a first user-defined attribute;
generating the summary in response to the single user interface action at least by referencing the identification of the relationship;
identifying a first object corresponding the first database table and a second object corresponding the second database table;
sending a request for accessing the first database table and the second database table;
in response to the request, processing an inter-object attribute over one or more rows in the first database table column or the second database table column at least by evaluating a formula with the data in the first database table column or the second database table column;
comparing a variance identified from the first database table column or the second database table column to a threshold pertaining to the inter-object attribute;
generating an alert based at least in part upon the variance, the inter-object attribute, and the threshold;
selecting a user-defined category code;
selecting a value for the user-defined category code, wherein a performance of selecting the value for the user-defined category code invokes an act of generating the summary; and
in response to selecting the value for the user-defined category code, invoking an act of generating the summary, wherein generating the summary comprises:
identifying one or more columns based at least in part upon the user-defined category code; and
presenting the summary by the user-defined category code.

5. The method of claim 1, wherein using at least some of display information pertaining to at least two database tables comprises using at least one of one or more project direct costs, one or more procurement contract costs, one or more labor costs, one or more labor rates, one or more budget amounts, one or more accounts payable amounts, one or more accounts receivable amounts, and a currency value selected from each one of the at least two database tables.

6. The method of claim 1, further comprising:
providing a graphical user interface for the user interface, the graphical user interface having a management menu area, a display options area, and a summary display area,
the management menu area comprising at least a menu bar selectable for initiating a configuration action,
the display options area displaying one or more configuration options and being responsive to one or more selections in the management menu area, the one or more configuration options being displayed in a row and column format, the one or more configuration options comprising at least a time period covered by displayed tables or accounts that are to be present in the summary display area, the display options area being collapsible and an area vacated by collapsing the display options area is subsequently occupied by the summary display area, and
the summary display area including a selection menu populated with monikers associated with user-defined attributes, wherein selecting a moniker from the selection menu initiates processing responsive to the single user interface action to generate the summary database table, prepare the display information, and display at least a third type of data in the user-configurable database table column of the summary database table, wherein
the at least one user-defined attribute is associated with one or more user-defined alerts, a user-defined alert being defined by the user and having one or more user-defined thresholds, the user-defined alert and the user-defined thresholds being configuration by the user using the graphical user interface, the user-defined alert comprising one or more of a color and an icon, the user-defined alert being configured using a pop-up window of the graphical user interface, a triggered alert comprising a visual depiction in a corresponding row and column of the summary database table, the visual depiction indicating one of multiple threshold levels using different visual indicators,
projects are organized into a hierarchy having a portfolio level, the portfolio level have a plurality of project activities,
a plurality of columns in the summary database table correspond to user-defined attributes and comprise user-configurable database table columns,
the user-configurable database table column is populated using at least one of a user-defined formula or user-defined function, and the user-defined formula calculates, converts, aggregates, or normalizes values,
the user accesses the first database table, the second database table, and the summary database table through a web server, and
the user-configurable database table column is populated by processing the at least one user-defined attribute over all rows in a column in the first database table and all rows in a column in the second database table, the processing of the at least one user-defined attribute over all rows in a column in the first database table and all rows in a column in the second database table comprising evaluating the user-defined formula or the user-defined function using column data as formula operands.

7. The method of claim 1, wherein the summary is of a third type of data that corresponds to at least one of the first type of data from the first database table column or the second type of data from the second database table column.

8. The method of claim 1, further comprising receiving from the user-interface at least one third database table to be related to at least one of the first database table using an additional user-defined attribute or to be related to the second database table using the additional user-defined attribute.

9. The method of claim 1, wherein the first database table stores a first value in a first unit of measurement, and the second database table stores a second value in a second unit of measurement different from the first unit of measurement.

10. The method of claim 1, further comprising storing the at least one user-defined attribute.

11. A computer program product embodied in a non-transitory computer readable medium, the computer readable medium having stored thereon a sequence of instructions which, when executed by a processor causes the processor to execute a process, the process comprising:
accessing, at a configuration engine of a management application, a first database table of a first project managed by a first application, the first database table comprising a plurality of first database table columns and a plurality of first database table rows;
accessing, at the configuration engine of the management application, a second database table of a second project managed by a second application, the second database table comprising a plurality of second database table rows and a plurality of second database table columns;
determining a relationship between a first database table column of the plurality of first database columns and a second database table column of the plurality of second database columns, wherein the first database table column stores a first set of data item values as a first type of data of the first project, and the second database table column stores a second set of data item values as a second type of data of the first project, and the first type is different from the second type;
configuring multiple thresholds that factor in conversions for the first and the second sets of data item values stored in different units of measurement;
storing the relationship as at least one user-defined attribute at the configuration engine of the management application, wherein
the at least one user-defined attribute relates the first database table column in the first database table of the first project to the second database table column in the second database table of the second project,
the at least one attribute includes summarization logic and an operation, wherein the summarization logic receives the first database table column and the second database table column as operands and performs the operation on at least one of the first database table column and the second database table column,
the first database table column selected from a column of the first database table, and
the second database table column is selected from a column of the second database table;
displaying a summary in a user interface for the first project and the second project based at least in part upon the at least one user-defined attribute at least by:
receiving a single user interface action by a user in the user interface, wherein the single user interface action selects the at least one user-defined attribute presented to the user in the user interface, and a selection of the at least one user-defined attribute in the user interface triggers an execution of the summarization logic in the at least one user-defined attribute for the first database table of the first project managed by the first application, and the second database table of the second project managed by the second application; and in response to the single user interface action, programmatically generating the summary from at least the first database table of the first project managed by the first application and the second database table of the second project managed by the second application at least by:

executing the summarization logic in response to the selection of the at least one user interface attribute to generate the summary at least by performing the operation defined by the at least one user-defined attribute on at least one of the first type of data and the second type of data, wherein the first type of data is in at least one row of the plurality of first database table rows corresponding to the first database table column of the first database table of the first project managed by the first application, and the second type of data is in at least one row of the plurality of second database table rows corresponding to the second database table column of the second database table of the second project managed by the second application; and storing the summary in a user-configurable database table column of summary database table;

displaying the summary in the user interface, the summary corresponding to at least some of the first type of data from first database table column of the first database table of the first project and at least some of the second type of data from the second database table column of the second database table of the second project in the user-configurable database table column of the summary database table; and displaying, in the user interface, a visual alert corresponding to one or more alerts that are displayed as emphasized rows comprising respective visual indicators in an alert column.

12. The computer program product of claim 11, further comprising instructions for presenting, in the user interface, display information that comprises the summary based at least in part on the at least one user-defined attribute.

13. The computer program product of claim 11, further comprising instructions for defining an alert icon based at least in part on the user-defined attribute.

14. The computer program product of claim 13, wherein the alert icon is defined based at least in part on a threshold value corresponding to the at least one user-defined attribute.

15. The computer program product of claim 11, wherein using at least some of display information pertaining to at least two database tables comprises using at least one of one or more project direct costs, one or more procurement contract costs, one or more labor costs, one or more labor rates, one or more budget amounts, one or more accounts payable amounts, one or more accounts receivable amounts, and a currency value selected from each one of the at least two database tables.

16. The computer program product of claim 11, the process further comprising:

providing a graphical user interface, the graphical user interface having a management menu area, a display options area, and a summary display area, the management menu area comprising at least a menu bar selectable for initiating a configuration action, the display options area displaying one or more configuration options and being responsive to one or more selections in the management menu area, the one or more configuration options being displayed in a row and column format, the one or more configuration options comprising at least a time period covered by displayed tables or accounts that are to be present in the summary display area, the display options area being collapsible and an area vacated by collapsing the display options area is subsequently occupied by the summary display area, and the summary display area including a selection menu populated with monikers associated with user-defined attributes, wherein selecting a moniker from the selection menu initiates processing responsive to the single user interface action to generate the summary database table, prepare the display information, and display at least a third type of data in the user-configurable database table column of the summary database table, wherein the at least one user-defined attribute is associated with one or more user-defined alerts, the user-defined alerts being defined by the user and having one or more user-defined thresholds, the user-defined alerts and the user-defined thresholds being configuration by the user using the graphical user interface, the user-defined alerts comprising one or more of a color and an icon, the user-defined alerts being configured using a pop-up window of the graphical user interface, a triggered alert comprising a visual depiction in a corresponding row and column of the summary database table, the visual depiction indicating one of multiple threshold levels using different visual indicators, projects are organized into a hierarchy having a portfolio level, the portfolio level have a plurality of project activities, a plurality of columns in the summary database table correspond to user-defined attributes and comprise user-configurable database table columns, the user-configurable database table column is populated using at least one of a user-defined formula or user-defined function, and the user-defined formula calculates, converts, aggregates, or normalizes values, the user accesses the first database table, the second database table, and the summary database table through a web server, and the user-configurable database table column is populated by processing the at least one user-defined attribute over all rows in a column in the first database table and all rows in a column in the second database table, the processing of the at least one user-defined attribute over all rows in a column in the first database table and all rows in a column in the second database table comprising evaluating the user-defined formula or the user-defined function using column data as formula operands.

17. The computer program product of claim 11, wherein the at least one user-defined attribute comprises a numeric calculation of a summarized labor cost based at least in part on a first labor rate and a second labor rate.

18. The computer program product of claim 11, further comprising instructions for receiving from the user-interface at least one third database table to be related to at least one of at least the first database table using an additional user-defined attribute or the second database table using the additional user-defined attribute.

19. A system comprising:
a memory storing a sequence of instructions; and
a processor, in which the sequence of instructions, when executed by the processor, performs a set of acts, the set of acts comprising:
accessing, at a configuration engine of a management application, a first database table of a first project managed by a first application, the first database table comprising a plurality of first database table columns and a plurality of first database table rows;
accessing, at the configuration engine of the management application, a second database table of a second project managed by a second application, the second database table comprising a plurality of second database table rows and a plurality of second database table columns;
determining a relationship between a first database table column of the plurality of first database columns and a second database table column of the plurality of second database columns, wherein the first database table column stores a first set of data item values as a first type of data of the first project, and the second database table column stores a second set of data item values as a second type of data of the first project, and the first type of data is different from the second type of data;
configuring multiple thresholds that factor in conversions for the first and the second sets of data item values stored in different units of measurement;
storing the relationship as at least one user-defined attribute at the configuration engine of the management application, wherein
the at least one user-defined attribute relates the first database table column in the first database table of the first project to the second database table column in the second database table of the second project,
the at least one attribute includes summarization logic and an operation, wherein the summarization logic receives the first database table column and the second database table column as operands and performs the operation on at least one of the first database table column and the second database table column,
the first database table column selected from a column of the first database table, and
the second database table column is selected from a column of the second database table;
displaying a summary in a user interface for the first project and the second project based at least in part upon the at least one user-defined attribute at least by:
receiving a single user interface action by a user in the user interface, wherein the single user interface action selects the at least one user-defined attribute presented to the user in the user interface, and a selection of the at least one user-defined attribute in the user interface triggers an execution of the summarization logic in the at least one user-defined attribute for the first database table of the first project managed by the first application, and the second database table of the second project managed by the second application;
in response to the single user interface action, programmatically generating the summary from at least the first database table of the first project managed by the first application and the second database table of the second project managed by the second application at least by:
executing the summarization logic in response to the selection of the at least one user interface attribute to generate the summary at least by performing the operation defined by the at least one user-defined attribute on at least one of the first type of data and the second type of data, wherein
the first type of data is in at least one row of the plurality of first database table rows corresponding to the first database table column of the first database table of the first project managed by the first application, and the second type of data is in at last one row of the plurality of second database table rows corresponding to the second database table column of the second database table of the second project managed by the second application; and
storing the summary in a user-configurable database table column of summary database table;
displaying the summary in the user interface, the summary corresponding to at least some of the first type of data from first database table column of the first database table of the first project and at least some of the second type of data from the second database table column-of the second database table of the second project in the user-configurable database table column of the summary database table; and
displaying, in the user interface, a visual alert corresponding to one or more alerts that are displayed as emphasized rows comprising respective visual indicators in an alert column.

20. The system of claim 19, the set of acts further comprising:
providing a graphical user interface, the graphical user interface having a management menu area, a display options area, and a summary display area,
the management menu area comprising at least a menu bar selectable for initiating a configuration action,
the display options area displaying one or more configuration options and being responsive to one or more selections in the management menu area, the one or more configuration options being displayed in a row and column format, the one or more configuration options comprising at least a time period covered by displayed tables or accounts that are to be present in the summary display area, the display options area being collapsible and an area vacated by collapsing the display options area is subsequently occupied by the summary display area, and
the summary display area including a selection menu populated with monikers associated with user-defined attributes, wherein selecting a moniker from the selection menu initiates processing responsive to the single user interface action to generate the summary database table, prepare the display information, and display at least a third type of data in the user-configurable database table column of the summary database table, wherein:

the at least one user-defined attribute is associated with one or more user-defined alerts, the user-defined alerts being defined by the user and having one or more user-defined thresholds, the user-defined alerts and the user-defined thresholds being configuration by the user using the graphical user interface, the user-defined alerts comprising one or more of a color and an icon, the user-defined alerts being configured using a pop-up window of the graphical user interface, a triggered alert comprising a visual depiction in a corresponding row and column of the summary database table, the visual depiction indicating one of multiple threshold levels using different visual indicators, projects are organized into a hierarchy having a portfolio level, the portfolio level have a plurality of project activities, a plurality of columns in the summary database table correspond to user-defined attributes and comprise user-configurable database table columns, the user-configurable database table column is populated using at least one of a user-defined formula or user-defined function, and the user-defined formula calculates, converts, aggregates, or normalizes values, the user accesses the first database table, the second database table, and the summary database table through a web server, and the user-configurable database table column is populated by processing the at least one user-defined attribute over all rows in a column in the first database table and all rows in a column in the second database table, the processing of the at least one user-defined attribute over all rows in a column in the first database table and all rows in a column in the second database table comprising evaluating the user-defined formula or the user-defined function using column data as formula operands.

\* \* \* \* \*